United States Patent Office 3,794,616
Patented Feb. 26, 1974

3,794,616
HEAT STABILIZED COMPOSITIONS
Kent S. Dennis and Willard E. Alexander, Midland, Mich., assignors to The Dow Chemical Company, Midland, Mich.
No Drawing. Filed Mar. 29, 1971, Ser. No. 129,116
Int. Cl. C08f 45/56, 45/58
U.S. Cl. 260—45.7 P                                    7 Claims

ABSTRACT OF THE DISCLOSURE

Anhydride-containing interpolymers such as a copolymer of styrene and maleic anhydride may be stabilized against thermal degradation by mixing the polymer with about 0.01 to 10 weight percent of an acid of P, S, B or Si.

BACKGROUND OF THE INVENTION

Heat stability of polymers always seems to be a problem and interpolymers such as styrene-maleic anhydride do not appear to be an exception. In U.S. 3,025,237 the heat stability of a copolymer such as styrene-maleic anhydride was improved, for purposes of secondary recovery of oil by flooding of the oil-bearing formation, by the process of converting the anhydride groups in the polymer to the half ester.

Problems of heat stability with such polymers are not confined to secondary oil-recovery flooding operations. Stability may be a problem in the preparation of the polymer itself. Frequently maleic anhydride copolymers are prepared by solution polymerization in a solvent which is a solvent for both the monomers and the polymer. Devolatilization from the polymer of solvent as well as of unreacted monomers, especially when a continuous polymerization process is used, usually decreases the molecular weight of the product. The product is a thermoplastic and as such may suffer undesirable degradation in the process of heating and shaping the polymer such as by compression or injection molding. The final product may also require stability to environmental heat exposure in numerous uses other than oil recovery. Thermal instability is manifested by a drop in molecular weight and by the evolution of $CO_2$.

SUMMARY OF THE INVENTION

This invention relates to anhydride polymer compositions having improved thermal stability and in particular to interpolymers of at least 50 mole percent of a monovinyl aromatic monomer and from about 8 to 50 mole percent of an unsaturated dicarboxylic acid anhydride. Typical of such interpolyers is an equimolar copolymer of styrene and maleic anhydride.

Improved thermal stability may be obtained by incorporating with said interpolymer about 0.01 to 10 weight percent of an acid of P, S, B or Si on the weight of the interpolymer. Typical of such acids are sulfuric and phosphoric acids and organic acids such as p-toluene sulfonic acid and di(2-ethylhexyl)phosphoric acid. More preferably the amount of said acid ranges from about 0.1 to 1 percent.

DESCRIPTION OF THE INVENTION

The anhydride interpolymers are well known polymers both as to variations in choice of monomers as well as to their methods of preparation. The most common of the interpolymers is a copolymer of styrene and maleic anhydride.

Maleic anhydride is difficultly polymerizable with itself but readily forms copolymers with a variety of monomers and readily forms equimolar copolymers with styrene and other like monovinyl aromatic monomers.

A widely used method is to prepare the polymers by solution polymerization in a solvent which is a solvent for both the monomers and the polymer employing free radical catalysts such as benzoyl peroxide. As indicated, the monomers prefer to copolymerize in equimolar proportions. U.S. 3,336,267 discloses how to make nonequimolar copolymers, e.g., 30 mole percent anhydride copolymers. A variety of other preparative methods are known, some of which are described in U.S. 3,418,292; U.S. 3,178,395; U.S. 2,971,939 and U.S. 2,838,475.

From the standpoint of this invention, improved thermal stability may be found with interpolymers of at least about 50 mole percent of a monovinyl aromatic monomer and of about 8 to 50 mole percent of an unsaturated dicarboxylic anhydride. Mixtures of each type of monomer may be used as long as the total mole percent of each mixture does not exceed the limits above. The upper limit, i.e., 1/1 molar ratio, is limited by the polymerizability of the monomers and is essentially inherent. The lower anhydride level is that at which a significant detectable improvement may be found.

It is to be understood that when the invention is described hereinafter with respect to copolymers of styrene-maleic anhydride that this is done for convenience sake only and not to limit the invention. Encompassed within the scope of the invention are interpolymers wherein the monovinyl aromatic monomer may be vinyltoluene, α-methylstyrene, t-butylstyrene, other alkylated styrenes, p-chlorostyrene, other halogenated styrenes, the various isomers of said monomers and the like. Styrene may be partly or completely replaced by any one or more of said aromatic monomers. Of course any such monomers should contain no group reactive with an anhydride group.

Likewise, maleic anhydride may be partly or completely replaced by any one or more of the halogenated or alkyl maleic anhydride monomers, citraconic anhydride, aconitic anhydride, itaconic anhydride and the like. Preferably and most usually the invention is related to copolymers of styrene and maleic anhydride.

Improved stability of said anhydride copolymers may be found with as little as 0.01 weight percent of an acid of P, S, B or Si. Preferably at least about 0.1 percent of said acid is present. As much as 10 weight percent of said acid may be present but usually no more than about 1 percent is needed. Preferably the acid additive is employed between about 0.1 and 1 weight percent wherein said percent is based on the weight of the anhydride interpolymer.

The P, S, B or Si acid may be intimately mixed with an already prepared anhydride polymer. This may be by dry blending or by melt blending. Said acid may also be added to the polymer syrup prior to devolatilization such as is found employing the process of U.S. 3,336,267. The acid may also be added during the polymerization of the anhydride polymer but this is a less preferred method.

Acids which are effective in this invention are the inorganic and organic acids of P, S, B and Si. Preferably the acids should be soluble or compatible in the molten or fluid form of the polymer. Inorganic acids include sulfuric acid, phosphoric acid, pyrophosphoric acid, boric acid, metaboric acid, silicic acid and the like. Sulfonic acids represent one group of useful organic acids including p-toluene sulfonic acid, naphthalene sulfonic acid, methane sulfonic acid, pyridine sulfonic acid, sulfanilic acid and the like. Another useful class of organic acids is the esters of sulfuric, phosphoric, boric and silicic acid. A readily available and useful ester typical of this class is di(2-ethylhexyl)phosphoric acid. Other examples of organic acids include phenyl boric acid, diphenyl silicic acid and the like.

Styrene-maleic anhydride begins to degrade rapidly above about 250° C. showing an initial rapid drop in molecular weight (viscosity) followed by a slower decrease. The major degradation product is $CO_2$ and the degradation rate (measured by the evolution of $CO_2$) increases as the maleic anhydride content in the polymer increases.

The following nonlimiting examples will further illustrate the invention. All parts and percentages are by weight unless otherwise specified.

EXAMPLE 1

The stabilizing effect of p-toluene sulfonic acid was evaluated on a styrene-maleic anhydride polymer syrup withdrawn from a continuous polymerizer. The polymer syrup contained about 50 percent solids and was produced at a rate of about 40 lbs./hour. The polymerization process employed the procedure of of U.S. 3,336,267 and the polymer produced contained about 75 percent styrene and 25 percent maleic anhydride. The syrup in addition to said polymer contained unreacted monomers and methyl ethyl ketone solvent (MEK). The normal production process included a subsequent devolatilization step to remove the unreacted monomers and solvent to recover the polymer.

A 50 percent solution of p-toluene sulfonic acid (pTSA) was prepared and in each of the runs was pumped into the polymer syrup ahead of an in-line mixer just before the syrup entered the devolatilizer heated at about 300° C. under vacuum. To determine the stabilizing effect of the p-toluene sulfonic acid, viscosities (indicative of molecular weight) were determined on polymer samples taken ahead of the introduction of the organic acid and after devolatilization. Three separate runs were made with the following results.

| | | | | | Polymer viscosity,[1] cps. | | |
|---|---|---|---|---|---|---|---|
| | | | Polymer syrup | | | Devolatilized product | |
| | Time of treatment (hrs.) | Percent pTSA | Lb./hr. | Percent solids | Syrup | Without pTSA | With pTSA |
| Run: | | | | | | | |
| 1a | 3 | 1.43 | 19 | 48 | 7.6 | 6.2 | 7.0 |
| 1b | 2.5 | 0.67 | 18 | 49 | 9.1 | 6.7 | 8.5 |
| 1c | 10 | 0.52 | 22 | 57 | 11.6 | 8.2 | 10.0 |

[1] 10 percent solution in MEK at 25° C.

The effectiveness of the p-toluene sulfonic acid in reducing the molecular weight drop of the polymer through the devolatilizing stage is self evident.

EXAMPLE 2

In another series of tests two different copolymers of styrene-maleic anhydride which varied in the percent of maleic anhydride were dissolved in tetrahydrofuran (20% solids) and then an acid of this invention was added and dissolved in the solution. The solvent was removed by heating at 100° C. under vacuum for 1 hour.

About 3 gm. of each of several mixtures prepared as above were placed in separate small galss vials (⅝" O.D. thin wall Pyrex, 3" long with a 4" long 7 mm. I.D. neck). The neck of the vial was connected to a vacuum system and the sample was heated under vacuum for 70 minutes in an oil bath controlled at a specific temperature. After cooling, the polymer was recovered by breaking the vial and 10 percent solution viscosities determined. Similar viscosities were determined on each polymer/acid mixture before the heating step. The results are recorded in the following table.

| Percent maleic anhydride | Heating temp., °C. | Wt. percent, acid | Type of acid | Viscosity, cps. Initial | Viscosity, cps. After heating |
|---|---|---|---|---|---|
| 18 | 300 | 0 | None | 13.9 | 3.5 |
| 18 | 300 | 0.5 | pTSA | 13.9 | 5.3 |
| 33 | 250 | 0 | None | 13.3 | 9.3 |
| 33 | 250 | 0.5 | 2-EHP[1] | 13.3 | 12.9 |
| 33 | 250 | 0.5 | $H_3PO_4$ | 13.3 | 12.9 |
| 33 | 250 | 0.1 | pTSA | 13.3 | 12.8 |
| 33 | 250 | 0.5 | Phenylboric | 13.3 | 11.7 |
| 33 | 250 | 0.5 | Diphenyl silicic acid [2] | 13.3 | 11.2 |

[1] Di(2-ethylhexyl)phosphoric acid.
[2] Also called diphenyldihydroxysilane.

EXAMPLE 3

About 0.1 gm. of a styrene-maleic anhydride copolymer containing 48% maleic anhydride was dissolved in 1 ml. of tetrahydrofuran (THF) and the solution used to wet the inside of a glass cell. The THF was removed under vacuum leaving a thin film of polymer on the walls and bottom of the cell. The cell was stoppered and placed in a constant temperature heating block.

Helium gas containing 0.5% Kr, 1.0% Ar, and 2.0% Ne was passed through the cell by means of a small tube which extended nearly to the bottom. The gas exited through another tube from the top of the cell and was led to a mass spectrometer where the spectrum was scanned every few minutes.

Degradation is readily followed by observing the evolution of $CO_2$ at mass 44. The doubly ionized Kr 84 peak at mass 42 was chosen as a convenient reference. The log of the ratio of mass 44/mass 42 times 100 gives a numerical measure of the amount of $CO_2$ evolved, a large value indicating large amounts of $CO_2$ and a small number, small amounts.

By means of the above test procedure separate tests were made employing 0.1% $H_2SO_4$, 1.0% methane sulfonic acid,. 0.05% p-toluene sulfonic acid and a control run with no acid stabilizer where the samples were heated at 275° C. In every case inhibition of $CO_2$ evolution was found with the acid present when the polymer was heated for about 20 minutes. The control very rapidly loses $CO_2$ in the first 5–10 minutes.

EXAMPLE 4

A test was made similar to that of Example 3 with a copolymer containing 33% maleic anhydride and having 3.3% of $H_3PO_4$ added to the polymer as a stabilizer. Again, significant inhibition of $CO_2$ was found with the $H_3PO_4$ present when the polymer/acid sample was heated at 300° C. for 60 minutes. The control with no acid stabilizer showed rapid loss of $CO_2$ in the first few minutes as in the previous example.

What is claimed is:

1. A composition stabilized against thermal decomposition comprising an interpolymer of an aromatic monovinyl monomer and an unsaturated dicarboxylic acid anhydride containing form about 0.01 to 10 weight percent on the basis of said interpolymer of an acid of P, B or Si wherein said interpolymer contains at least 50 mole percent of said aromatic monomer and from 8 up to 50 mole percent of said anhydride monomer.

2. The composition of claim 1 wherein said acid is phosphoric acid or di(2-ethylhexyl)phosphoric acid.

3. The composition of claim 1 wherein said acid is phenyl boric or diphenyl silicic acid.

4. The composition of claim 1 wherein said interpolymer is a copolymer of styrene and maleic anhydride.

5. The composition of claim 4 wherein said acid is phosphoric acid or di(2-ethylhexyl)phosphoric acid.

6. The composition of claim 4 wherein said acid is phenyl boric or diphenyl silicic acid.

7. The composition according to claim 1 wherein said acid is present in amounts of about 0.1 to 1 weight percent.

References Cited
UNITED STATES PATENTS

| | | | |
|---|---|---|---|
| 2,589,446 | 3/1952 | Sommer | 260—448.2 |
| 3,574,162 | 4/1971 | Barr | 260—45.7 |
| 3,297,654 | 1/1967 | Barr et al. | 260—78.5 |
| 3,336,267 | 8/1967 | Zimmerman et al. | 260—78.5 |
| 3,507,838 | 4/1970 | Vervloet | 260—78.4 |
| 3,531,427 | 9/1970 | Kervenski et al. | 260—29.6 |

OTHER REFERENCES

Kirk et al., "Encyclopedia of Chemical Technology," 2nd ed., vol. 3, 1964, pp. 722 and 723.

Rose et al., "The Condensed Chemical Dictionary," 7th ed., 1966, p. 426.

Kirk et al., "Encyclopedia of Chemical Technology," 2nd edition, vol. 19, p. 311 (1969).

DONALD E. CZAJA, Primary Examiner

R. A. WHITE, Assistant Examiner

U.S. Cl. X.R.

260—45.7 R, 45.7 S